United States Patent
Thomason et al.

(10) Patent No.: US 9,424,815 B2
(45) Date of Patent: Aug. 23, 2016

(54) METHOD FOR VISUAL DIFFERENCING WITH ATTRIBUTION

(71) Applicant: ADOBE SYSTEMS INCORPORATED, San Jose, CA (US)

(72) Inventors: Lee Bryan Thomason, Berkeley, CA (US); Jason Rodney Williams, Menlo Park, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 187 days.

(21) Appl. No.: 14/329,385

(22) Filed: Jul. 11, 2014

(65) Prior Publication Data

US 2016/0012803 A1 Jan. 14, 2016

(51) Int. Cl.
| | |
|---|---|
| *G06T 1/00* | (2006.01) |
| *G06T 15/00* | (2011.01) |
| *G09G 5/40* | (2006.01) |
| *G09G 5/36* | (2006.01) |
| *G06F 17/30* | (2006.01) |
| *G06T 11/60* | (2006.01) |

(52) U.S. Cl.
CPC ......... *G09G 5/40* (2013.01); *G06F 17/30244* (2013.01); *G06T 11/60* (2013.01); *G09G 5/363* (2013.01)

(58) Field of Classification Search
None
See application file for complete search history.

(56) References Cited

U.S. PATENT DOCUMENTS

| | | | | |
|---|---|---|---|---|
| 6,982,729 | B1 * | 1/2006 | Lange | G09G 5/14 345/3.4 |
| 8,493,354 | B1 * | 7/2013 | Birnbaum | G06F 3/016 340/407.2 |
| 2006/0235716 | A1 * | 10/2006 | Mahesh | G06F 19/321 709/204 |
| 2008/0285892 | A1 * | 11/2008 | Sposato | G06T 11/60 382/311 |
| 2013/0332857 | A1 * | 12/2013 | Kim | H04L 65/403 715/753 |

* cited by examiner

*Primary Examiner* — Kee M Tung
*Assistant Examiner* — Frank Chen
(74) *Attorney, Agent, or Firm* — Shook, Hardy & Bacon L.L.P.

(57) ABSTRACT

Art stream commands comprising gestures, drawing state, and attribution information are received from one or more clients participating in a collaboration session. The art stream commands enable the rendering of and provide source control for a visual document. Attribution for visual differences may be provided. Each of the one or more clients may rewind and play back the art stream commands to provide a detailed understanding of what was contributed by whom. All changes and image variations are non-destructive.

19 Claims, 10 Drawing Sheets

METHOD FOR VISUAL DIFFERENCING WITH ATTRIBUTION

BACKGROUND

Artists often share drawings with the community but want recognition for contributions and origination of drawings. Often, artists collaborate with peers and want to see what changes were made to a particular drawing by a particular contributor. This allows artists to see what derivative works have been created and by whom. However, when sharing work digitally, it is extremely difficult to keep track of who has viewed, downloaded, created a derivative work, or incorporated a drawing into an existing work.

Currently, artists generally keep prior versions of files and creations being worked on outside of source control. When source control is used, differences between versions are limited to differences in the pixels. While this allows artists to scan an evolving set of thumbnails, the actual visual difference between images and attribution for the difference cannot be provided. Further, rendering alternative drawings utilizing non-destructive changes to inputs used to create a collaborative drawing is not possible.

SUMMARY

This summary is provided to introduce a selection of concepts in a simplified form that are further described below in the Detailed Description. This summary is not intended to identify key features or essential features of the claimed subject matter, nor should it be used as an aid in determining the scope of the claimed subject matter.

Embodiments of the present invention relate to providing visual differencing between contributions from one or more clients with attribution information. One or more art stream commands comprising gestures, drawing state, and attribution information are received from one or more clients. The gestures may utilize normalized coordinates mapped to pixels. The one or more art stream commands are merged together into a merged set of art stream commands. The merged set of art stream commands are communicated to the one or more clients. Layer information may be included within the one or more art stream commands. The merged set of art stream commands may be separated in accordance with a selection of a layer from the one or more clients. A set of art stream commands between two points in time may be communicated to the one or more clients to create visual differences. Additional art stream commands may be received from the one or more clients that may be merged with the merged set of art stream commands or used to replace an art stream command in the merged set.

BRIEF DESCRIPTION OF THE DRAWINGS

The present invention is described in detail below with reference to the attached drawing figures, wherein.

DETAILED DESCRIPTION

Figure 1:
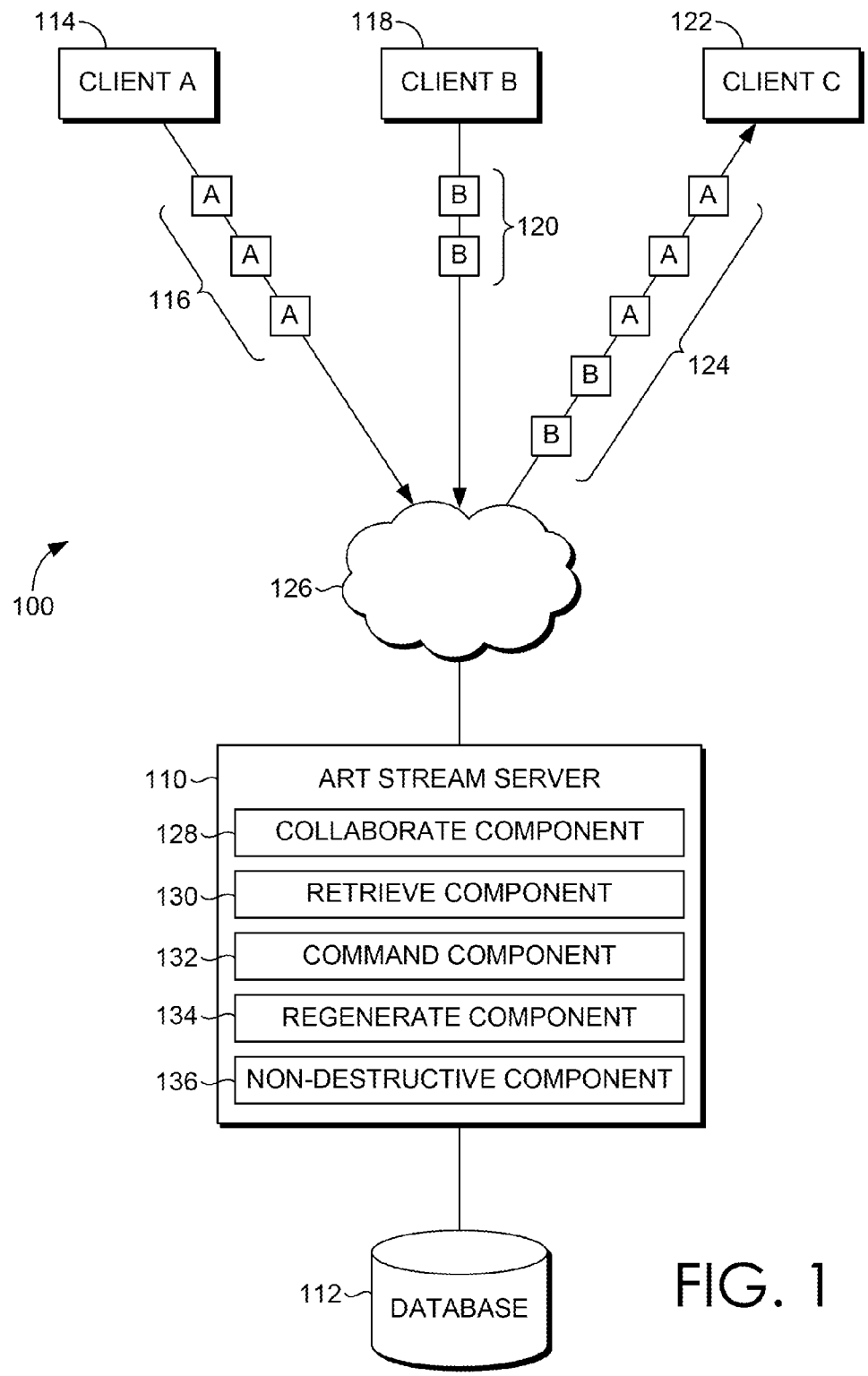
FIG. 1 is a block diagram showing a system for determining visual differences between images in accordance with an embodiment of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As noted in the Background, current systems have been developed identifying differences between versions based on changes in pixels. However, these systems cannot provide the actual intermediate visual differences between images or attribution for each visual difference. Further, these systems cannot render alternative drawings utilizing non-destructive changes to inputs.

Embodiments of the present invention are generally directed to providing visual differencing and attribution for contributions of one or more artists in a collaborative or asynchronous setting. An art stream is a command stream that includes art stream commands. The art stream commands comprise input gestures, drawing state (e.g., current brush color and width), and attribution used to create a drawing are communicated from one or more clients to a server. For example, when a user makes a mark on a digital canvas, the values of the position and time differential for each point required in representing the mark are captured and saved in normalized resolution and time-independent fashion. The client streams this data to the server, which, in the case of multiple clients, resolves conflicts and stores the definitive representation (i.e., the art stream) for the drawing. This enables the server to communicate a merged set of art stream commands to a client that can be utilized to regenerate the drawing at any time. The representation of the drawing is interpreted linearly with atomic operations rather than as a compressed binary blob typical of image formats. More clearly, the art streams are a protocol used by clients to communicate to a central server as well as a format for recording the gestures and state changes. This ordered, tagged, and attributed representation enables the rendering of a visual document and provides the advantages of text-based source control systems.

Capturing the data linearly further allows visual differencing and attribution. For example, the drawing can be regenerated from its origin to any point in history, between any two points in the drawing history, or bracketing the contribution of a particular user. Because the visual differencing is not a difference in pixels, but an actual sub-drawing that can be rendered, there are many ways the drawing can be rendered. The sub-drawing can be composited with the original in a layered fashion (e.g., using alpha blending, etc.) to make attribution from an artist stand out. Additionally, since the difference is a time-ordered set of gestures, it can be viewed as a static visual difference or as a movie that plays back the gestures and state changes. This allows for a detailed understanding of what was contributed by whom, particularly in instances where artists work collaboratively or where artists are working asynchronously and remixing the work of others.

Accordingly, in one aspect, an embodiment of the present invention is directed to a non-transitory computer storage medium comprising computer-useable instructions that, when used by one or more computing devices, cause the one or more computing devices to perform operations. The operations include receiving one or more art stream commands from one or more clients. The one or more art stream commands may comprise gestures, drawing state, and attribution information. The operations also include merging the one or more art stream commands together into a merged set of art stream commands. The operations further include communicating the merged set of art stream commands to the one or more clients.

In another embodiment of the invention, an aspect is directed to a computer-implemented method. The method includes receiving, from one or more clients, a collaboration request. The collaboration request may enable the one or more clients to interact with an image. The method also includes receiving a set of one or more art stream commands. The one or more art stream commands may comprise gestures, drawing state, and attribution information from the one or more clients participating in a collaboration session. The method further includes enabling each of the one or more clients to rewind and play back the one or more art stream commands. The method also includes receiving an identification of a creative decision point corresponding to one of the one or more art stream commands. The method further includes receiving one or more additional art stream commands from the one or more clients. The one or more additional art stream commands may be non-destructive. The method also includes enabling each of the one or more clients to regenerate the image in accordance with the one or selected art stream commands.

A further embodiment is directed to a computerized system comprising: one or more processors; and one or more computer storage media storing computer-useable instructions that, when used by the one or more processors, cause the one or more processors to: receive a set of one or more art stream commands comprising gestures, drawing state, and attribution information from the one or more clients participating in a collaboration session, the set of one or more art stream commands corresponding to an image; enable each of the one or more clients to rewind and play back the one or more art stream commands; and receive one or more additional art stream commands, the additional art stream commands being non-destructive to the image.

Referring now to FIG. 1, a block diagram is provided that illustrates a visual difference system 100 for providing visual differencing and attribution for contributions of one or more artists in a collaborative or asynchronous setting in accordance with an embodiment of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory. The visual differencing system 100 may be implemented via any type of computing device, such as computing device 1000 described below with reference to FIG. 10, for example. In various embodiments, the visual differencing system 100 may be implemented via a single device or multiple devices cooperating in a distributed environment.

The visual differencing system 100 generally operates to provide visual differencing with attribution in a real-time or asynchronous, collaborative environment. Among other components not shown, the system 100 may include on or more user devices 114, 118, 122, an art stream server 110, and an image data store 112. It should be understood that the system 100 shown in FIG. 1 is an example of one suitable computing system architecture. Each of the components shown in FIG. 1 may be implemented via any type of computing device, such as computing device 1000 described with reference to FIG. 10, for example. The components may communicate with each other via a network 126, which may include, without limitation, one or more local area networks (LANs) and/or wide area networks (WANs). Such networking environments are commonplace in offices, enterprise-wide computer networks, intranets, and the Internet. It should be understood that any number of user devices, art stream servers, and image data stores may be employed within the system 100 within the scope of the present invention. Each may comprise a single device or multiple devices cooperating in a distributed environment. For instance, the art stream server 110 may be provided via multiple devices arranged in a distributed environment that collectively provide the functionality described herein. In another instance, the art stream server 110 and functionality of one or more of the other components that comprise the visual differencing system 100 may be provided via a single device. Additionally, other components not shown may also be included within the network environment.

As shown in FIG. 1, the visual differencing system 100 includes an art stream server 110 that provides a real-time or asynchronous, collaborative environment for images received from and/or stored in image data store 112. While only a single image data store 112 is shown in FIG. 1, it should be understood that the visual differencing system 100 may employ any number of image data stores. The image data store 112 may include pre-existing images that may be utilized by one or more users in the real-time or asynchronous, collaborative environment. By way of example only and not limitation, a user may desire to utilize elements of an image originally created and shared by another user. The user may retrieve the image from the image data store 112 via the art stream server 110. The image data store 112 may include variations of the image by saving each of the art stream commands received by the art stream server 110. Saving each of the art stream commands further enables a user to retrieve and play back the art stream commands and/or identify creative decision points corresponding to one of the art stream commands.

As shown in FIG. 1, the art stream server 110 includes, among other things not shown, a collaborate component 128, a retrieve component 130, a command component 132, a regenerate component 134, and a non-destructive component 136. The collaborate component 128 may receive a collaboration request. The collaboration request enables one or more clients to interact with an image. The collaboration request may further include a selection of a preexisting image (e.g., an image from the image data store 112).

The collaboration request may be the actual selection of an image or may be inferred based on what the user is currently drawing. For example, if the user begins drawing a circle such as may be inferred by an initial set of art stream commands being received by command component 132, the collaboration component 128 may infer the user wishes to interact with an image of a circle. Accordingly, the retrieve component 130 may retrieve exemplary circles from the image data store 112 and the user may select the most desired image. In another example, the retrieve component 130 may automatically retrieve an exemplary circle from the image data store 112 based on images originating from previous users that particular user has collaborated with or indicated are exemplary based on the inference (i.e., a particular user is known is widely appreciated for drawing circles).

As briefly described above, command component 132 may receive a set of one or more art stream commands 116, 120 from one or more clients 114, 118, 122 participating in a collaboration session. The set of one or more art stream commands may correspond to an image. The set of one or more art stream commands may comprise gestures, drawing state, and attribution information. As each user interacts with a digital canvas, the values of the position and time differential for each point associated with that interaction are received from each client 114, 118, 122 and saved to image data store 112. Further, art stream commands 124 received from other users are communicated to each user allowing the image to be updated for each user in accordance with commands received from all users. In other words, two-way communication between the art stream server 110 and each client 114, 118, 122 enables each client to communicate art stream commands to the art stream server 110 as well as receive art stream commands made by other clients from the art stream server 110.

The stored set of art stream commands allows the regenerate component 134 to enable each of the one or more clients to rewind and play back the one or more art stream commands. Thus, the regenerate component 134 enables recreation of the drawing for visual differencing and attribution. For example, each client can regenerate the drawing between any two points in the drawing history or to identify contributions made by each user. The regenerate component 134 may allow a user to identify static visual differences or as a movie that plays back each gesture and state change. As can be appreciated, playing back the one or more art stream commands allows for a detailed understanding of what portion of the collaboration was contributed by whom. Further any changes or variations in the drawing may also be easily identified as described more fully below.

Non-destructive component 136 receives one or more additional art stream commands from the one or more clients 114, 118, 122. Each of the additional art stream commands are non-destructive to the image. In other words, because each art stream command is received by command component 132 or non-destructive component 136 and stored in image data store 112, any user participating in the collaboration session may select a creative decision point corresponding to one of the one or more art stream commands.

The creative decision point may represent a decision made by another user that the user wishes to change or undo. Accordingly, an additional art stream command may be received from the client associated with that user. Branches may be created for the collaboration based on deviations one or more of the users make, which essentially creates a derivative work of the initial drawing. The additional art stream commands may be merged into the merged set such that as a user regenerates the drawing, the drawing is recreated so the user sees how the drawing was created originally and how art stream commands changed the drawing over time. This recreation of the drawing utilizing each type of art stream command in its history is what is meant by non-destructive change. Rather than changing the underlying drawing, each change can be recreated or rolled back by replaying or not-replaying the particular art stream command associated with the change.

Figure 2:
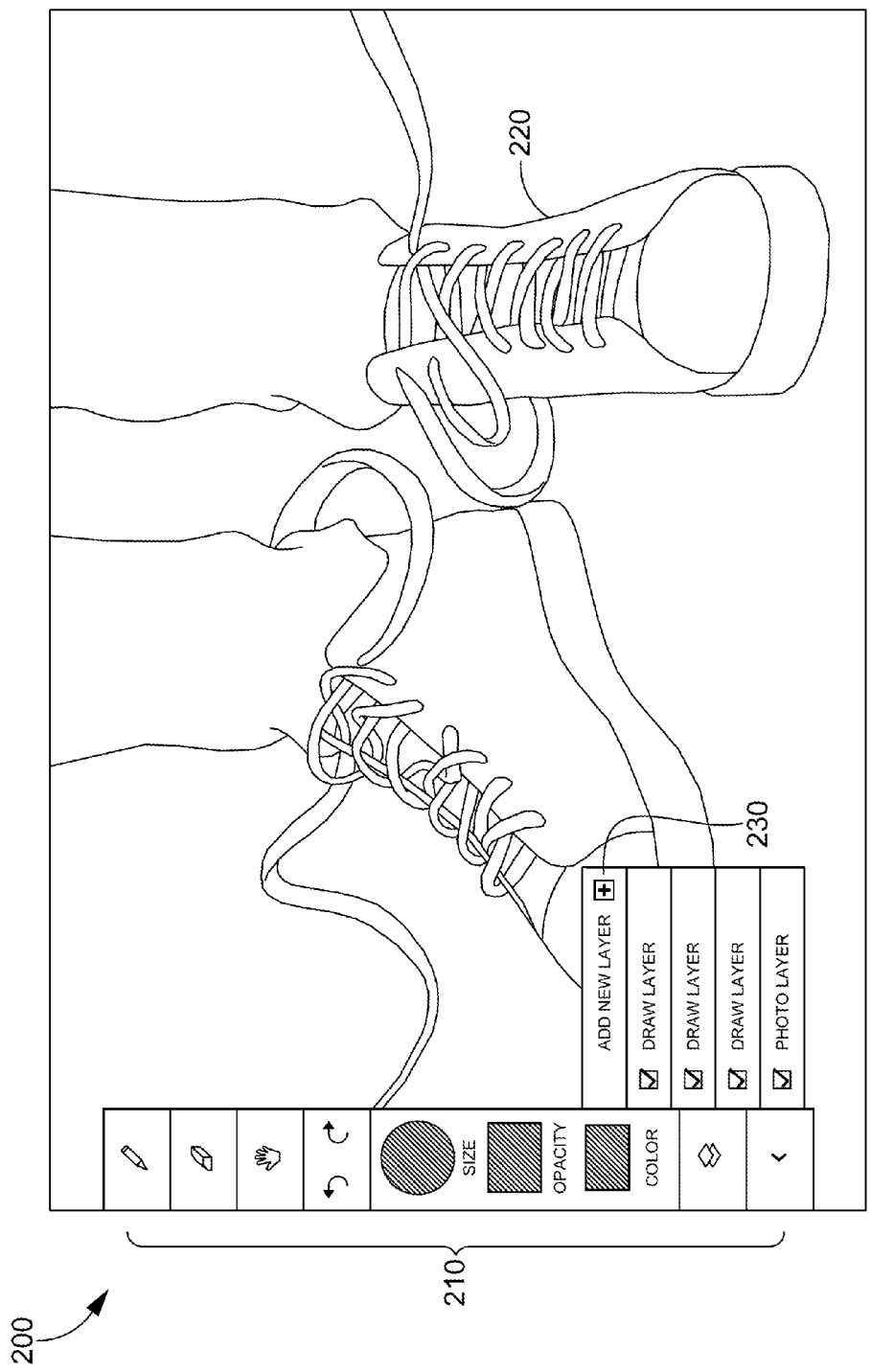
FIG. 2 is an exemplary diagram of creating a collaborative drawing in accordance with an embodiment of the present invention.

An exemplary diagram of a collaborative drawing 200 that may be created and provided is shown in FIG. 2. As can be seen in FIG. 2, an image 220 is initially created or retrieved by a user. As the user interacts with the image by utilizing any of the tools 210 to interact with the image, each of the corresponding gestures and state changes are recorded. The user may further create a new branch or add a new layer to the image 230. In this example, the user does not start with a blank slate. Rather, the user downloads an image (e.g., a pair of sneakers) from another user. Because the user is collaborating with a team of users for this project, the image is synced with the other users in a collaboration session.

Figure 3:
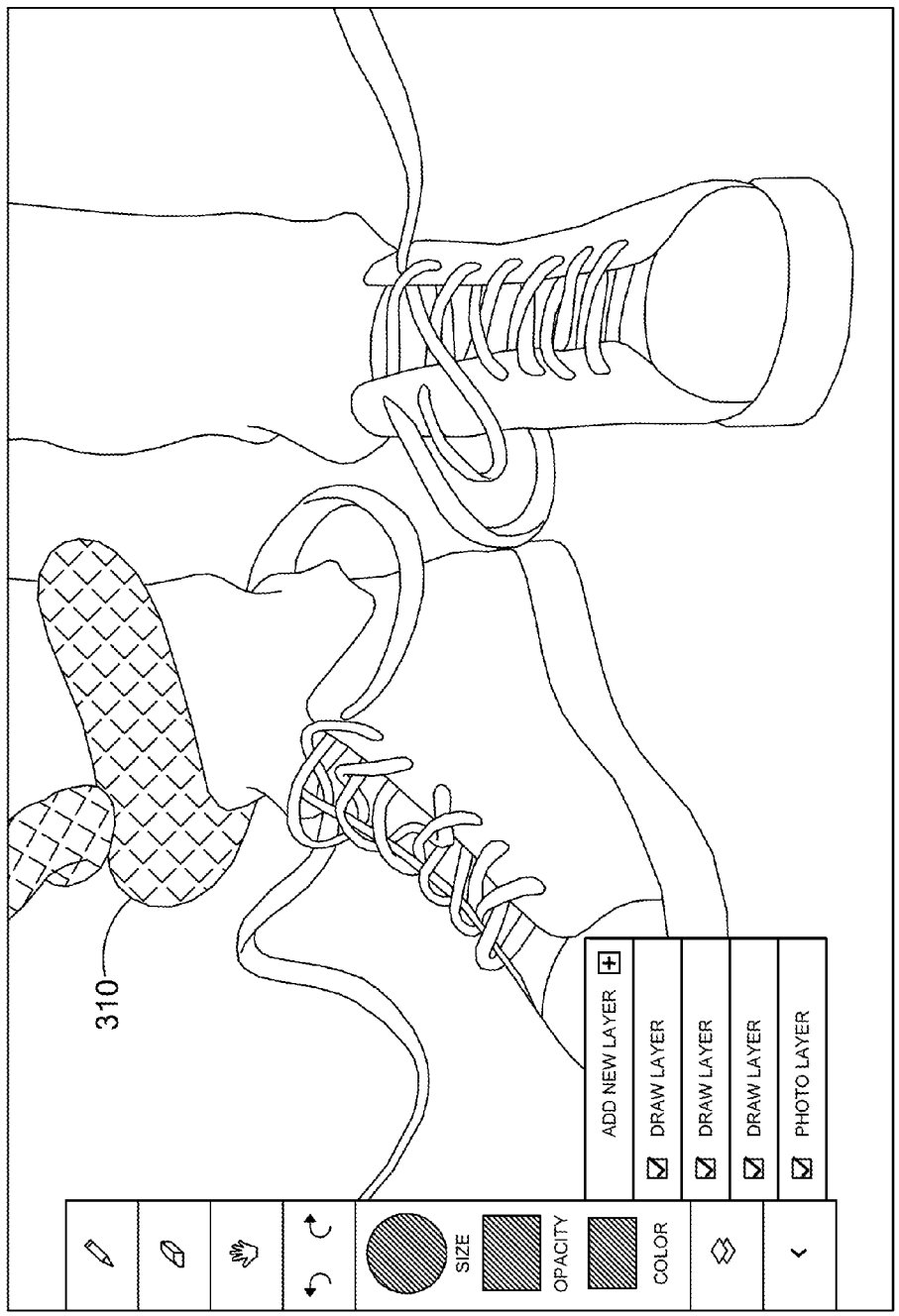
FIG. 3 is an exemplary diagram of editing a collaborative drawing with a non-destructive change in accordance with an embodiment of the present invention.

In FIG. 3, an exemplary diagram of a collaborative drawing 300 being edited with a non-destructive change is provided. As can be seen in FIG. 3, the image has been shared with another user who views the image from another device. The image is automatically regenerated for the screen size associated with each device. In other words, images are not resized; rather, they are recreated at the target device resolution. As illustrated, this user has added a snake 310 to the drawing. As described, this addition is non-destructive because if another user does not like the snake, the other user can play back the image up to the point in time the snake was added (e.g., creative decision point) and decide to not play back (or undo) the art stream commands associated with the addition of the snake.

Figure 4:
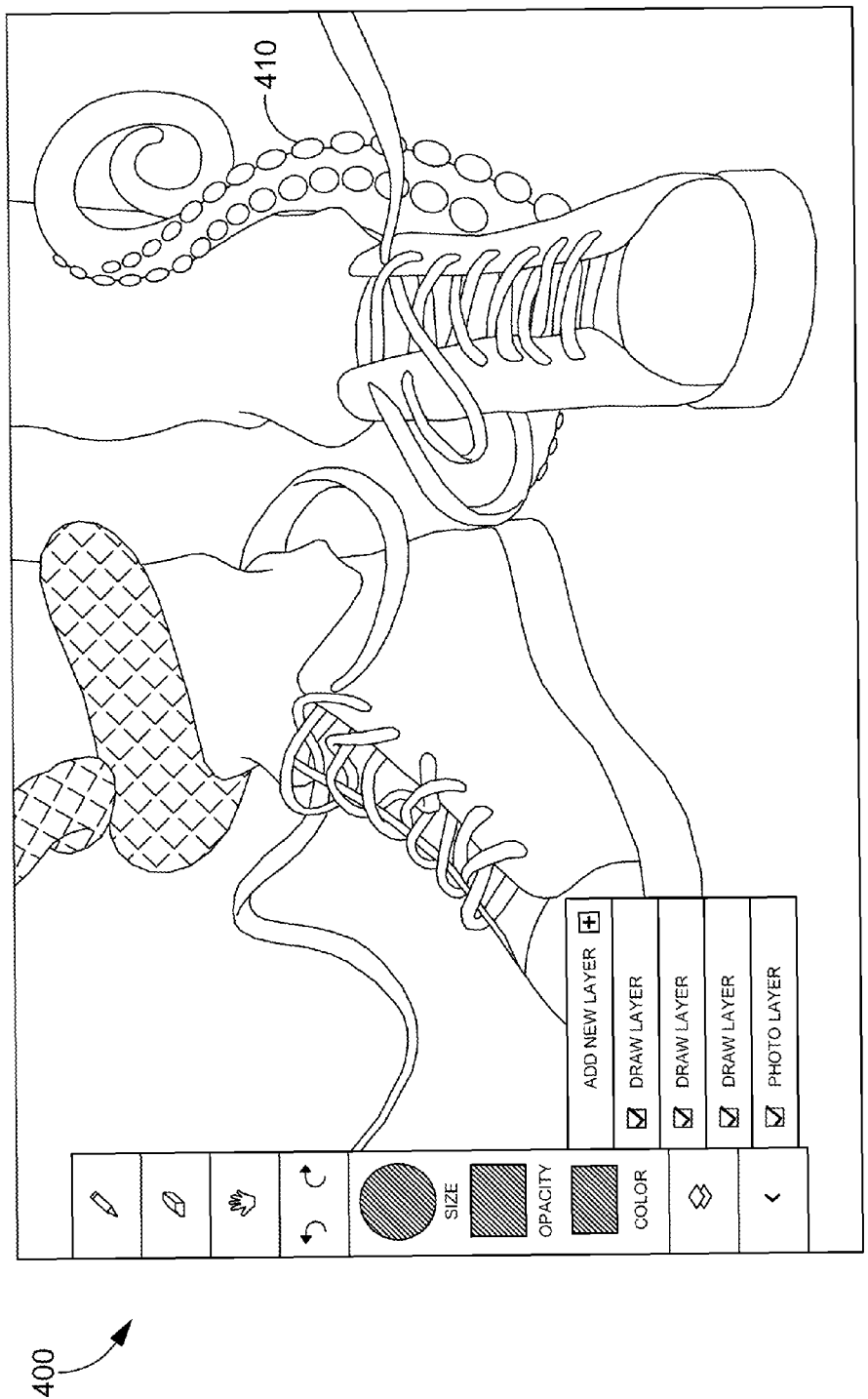
FIG. 4 is an exemplary diagram of editing a collaborative drawing with a non-destructive change in accordance with an embodiment of the present invention.

FIG. 4 illustrates an exemplary diagram of a collaborative drawing 400 being edited with a non-destructive change. As illustrated, another user has added an octopus 410 to the drawing. This addition is also non-destructive because if another user does not like the octopus, that user can play back the image up to the point in time the octopus was added and decide to not play back the art stream commands associated with the addition of the octopus. Further, the user may decide to create a new branch of the drawing. The new branch creates a different path such that playing back the drawing plays back art stream commands corresponding to the new branch. At any point, if the users in the collaboration session determine a non-destructive change is appropriate (either in a new branch or not), the art stream commands associated with the non-destructive change can be merged into the drawing at the appropriate point in time to create a new merged set of art stream commands representing the image incorporating the change.

Figure 5:
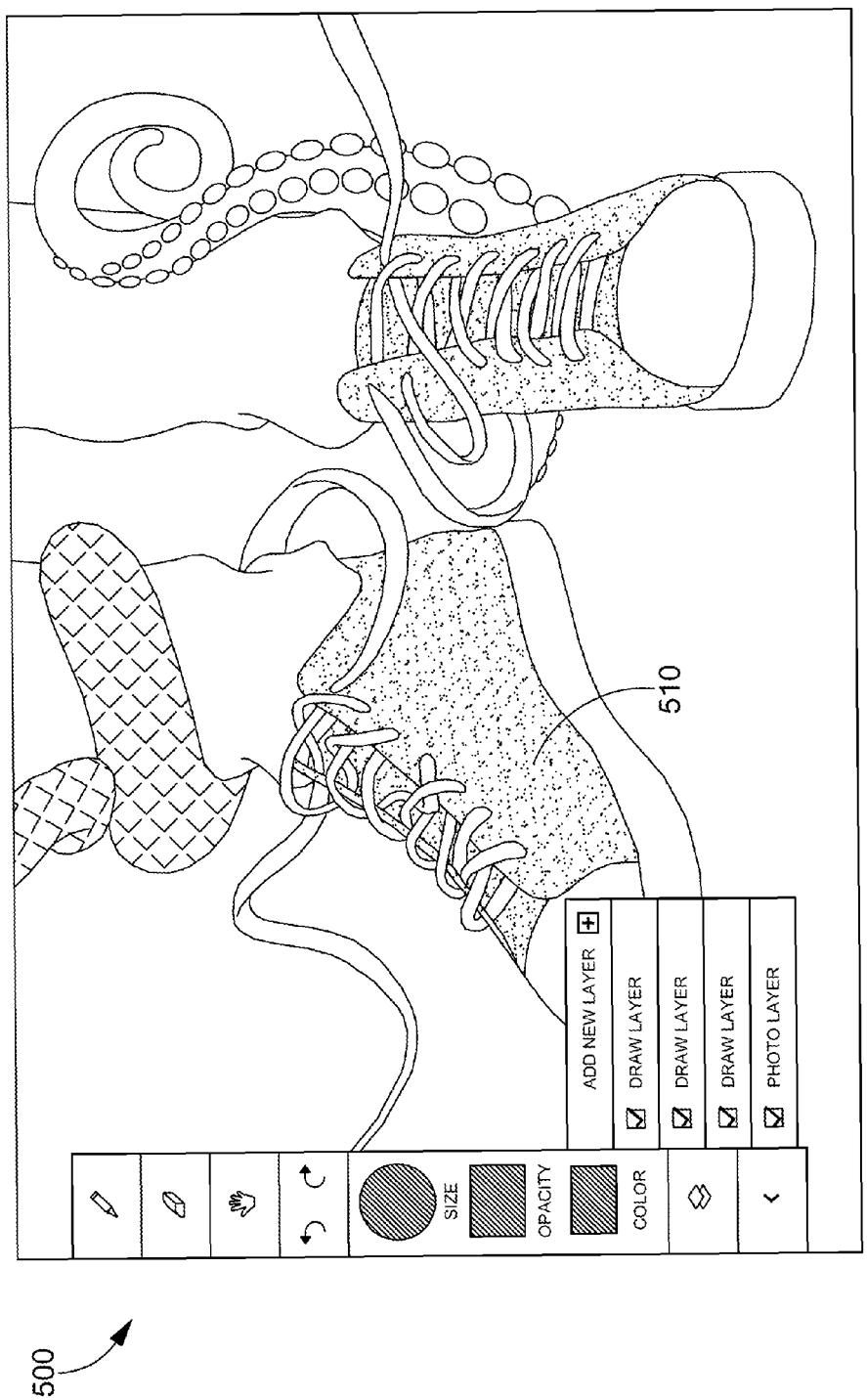
FIG. 5 is an exemplary diagram of editing a collaborative drawing with a non-destructive change in accordance with an embodiment of the present invention.

As can be seen in FIG. 5, a collaborative drawing 500 is edited with a non-destructive change. In this example, another user does not like the color palette associated with the sneakers. Accordingly, this user may play back the drawing to the creative decision point where the original color palette was selected. A different color palette may be selected and the drawing is regenerated in the different color palette. In this example, the sneakers are redrawn with the different color palette 510. A user playing back the drawing will observe the sneakers first being drawn in the original color palette and then regenerated in the different color palette.

Figure 6:
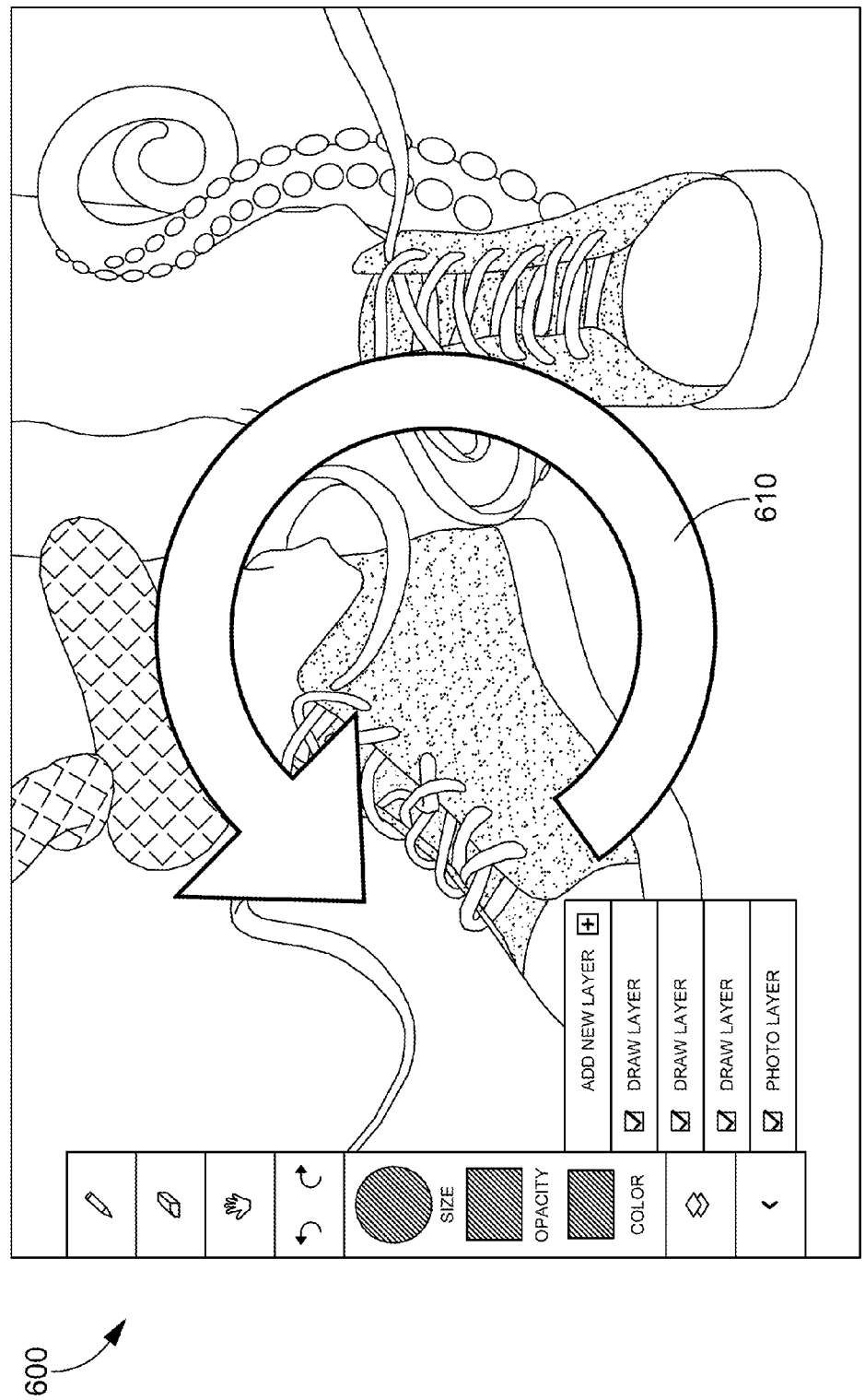
FIG. 6 is an exemplary diagram of regenerating a collaborative drawing in accordance with an embodiment of the present invention.

In FIG. 6, an exemplary diagram of a collaborative drawing 600 being regenerated is provided. As can be seen in FIG. 6, the user may rewind and play back or regenerate the image in accordance with the art stream commands. For example, the user may select a regenerate button 610 that replays each art stream command to the user providing the user a detailed understanding of what was contributed by whom. As described above, the user may stop the replay at any point to vary the image with a different creative decision (e.g., color palette change or other variation of the image).

Figure 7:
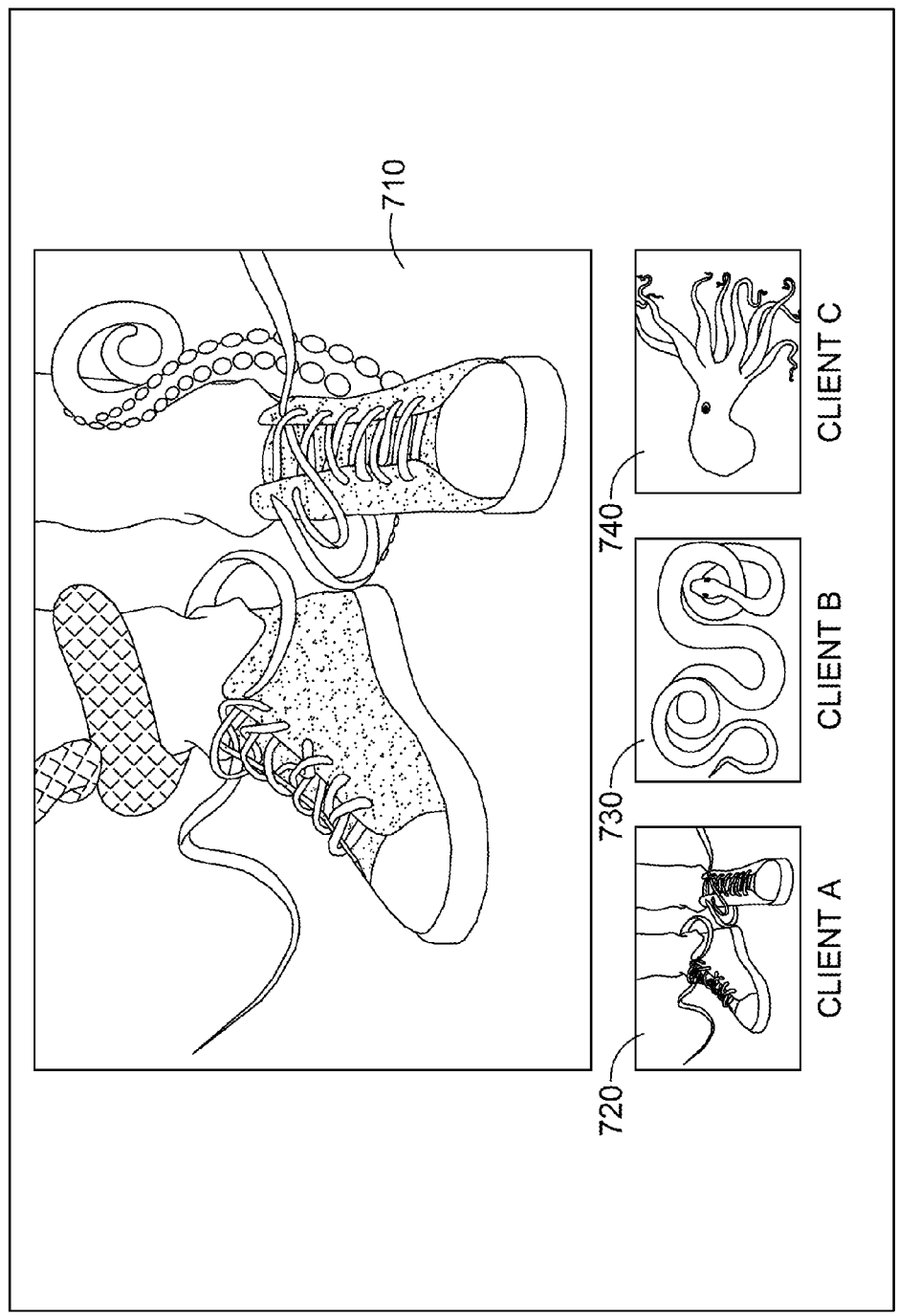
FIG. 7 is an exemplary diagram of providing visual attribution for a collaborative drawing in accordance with an embodiment of the present invention.

FIG. 7 illustrates an exemplary diagram of a collaborative drawing 700 being provided with visual attribution. As illustrated, the user is able to readily identify the contribution of each client to the overall image 710. In this example, a user is able to see the visual difference provided by each client to the collaboration. For example, Client A provided the sneaker portion 720, Client B provided the snake portion 730, and Client C provided the octopus portion 740. As can be appreciated the visual difference may provide a user with the actual contribution represented by each art stream command received from each user.

Figure 8:
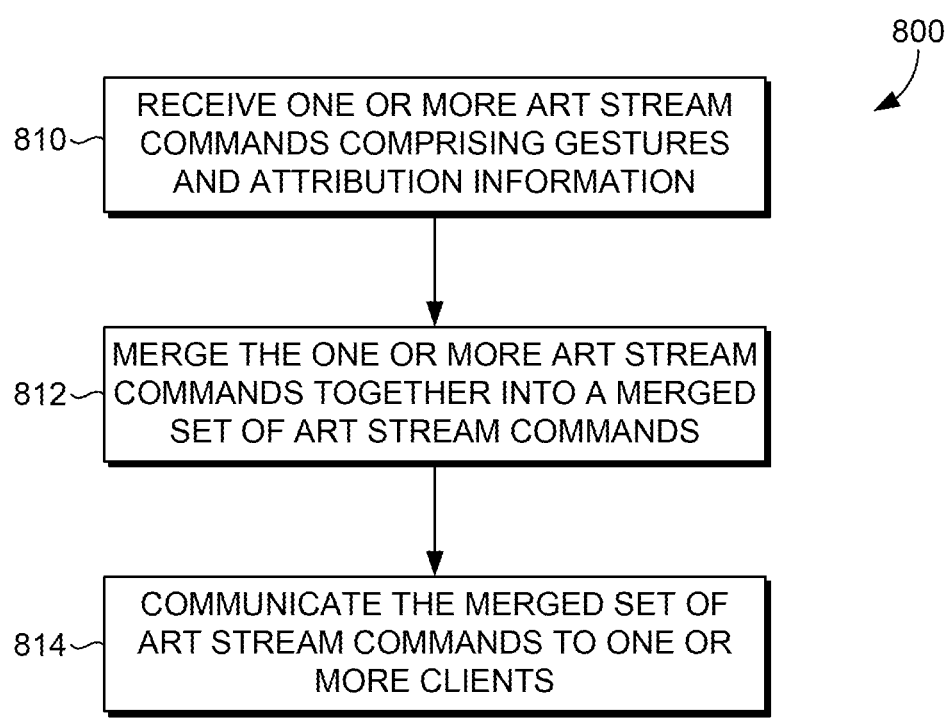
FIG. 8 is a flow diagram showing a method for capturing a time-ordered set of art stream commands in accordance with an embodiment of the present invention.

Referring now to FIG. 8, a flow diagram is provided that illustrates a method 800 for capturing a time-ordered set of art stream commands in accordance with an embodiment of the present invention. The method 800 may be performed, for instance, by the visual differencing system 100 of FIG. 1. As shown at block 810, one or more art stream commands are received from one or more clients. The one or more art stream commands may comprise gestures, drawing state, and attribution information. The gestures may utilize normalized coordinates mapped to pixels. Conflicts between one or more art streams received at similar times may be resolved by determining which art stream was actually received by the visual differencing system 100 first and ordering each art stream in a time-ordered fashion. In one embodiment, layer information may be included within the one or more art stream commands. The layer information may be based on attribution.

At block 812, the one or more art stream commands are merged together into a merged set of art stream commands. The merged set of art stream commands are communicated, at block 814, to the one or more clients. The merged set of art stream commands may be separated in accordance with a selection of a layer from one of the one or more clients. A separated set of art stream commands may be communicated in accordance with the selection.

In one embodiment, a selection of an existing image is received. The existing image may comprise one or more art stream commands. This allows a user to avoid creating each image from scratch by utilizing elements of a selected image. The art stream commands associated with the selected image may be retrieved by the user from an image data store. The existing image may be enabled to be regenerated on a device associated with the one or more clients at a resolution optimized for the device without resizing the existing image.

In one embodiment, a visual difference set of art stream commands is communicated to one or more clients. The visual difference set of art stream commands may comprise one or more art stream commands received between two points in time. For example, because the art stream commands are received in a time-ordered fashion, a user may wish to be provided with a visual of what has changed to an image between selected points in time. After selecting the points in time, the art stream commands received between those points in time are regenerated, allowing the user to see exactly what commands were received during that time period.

In one embodiment, an identification of a creative decision point is received. The creative decision point represents a point in time in which one art stream command was received. One user may wish to change a decision made by another user at that point in time that may alter the image. Accordingly, the user may replace that decision with a different decision (e.g., changing the color palette, changing an interaction with the image, etc.) represented by an additional art stream command. The changes are merged in a time-ordered fashion to the merged set of art stream commands. The result is that when the image is regenerated, the image is first regenerated with the original art stream command, and as time passes, the additional art stream command causes the image to change accordingly reflecting the second user making a different creative decision.

Figure 9:
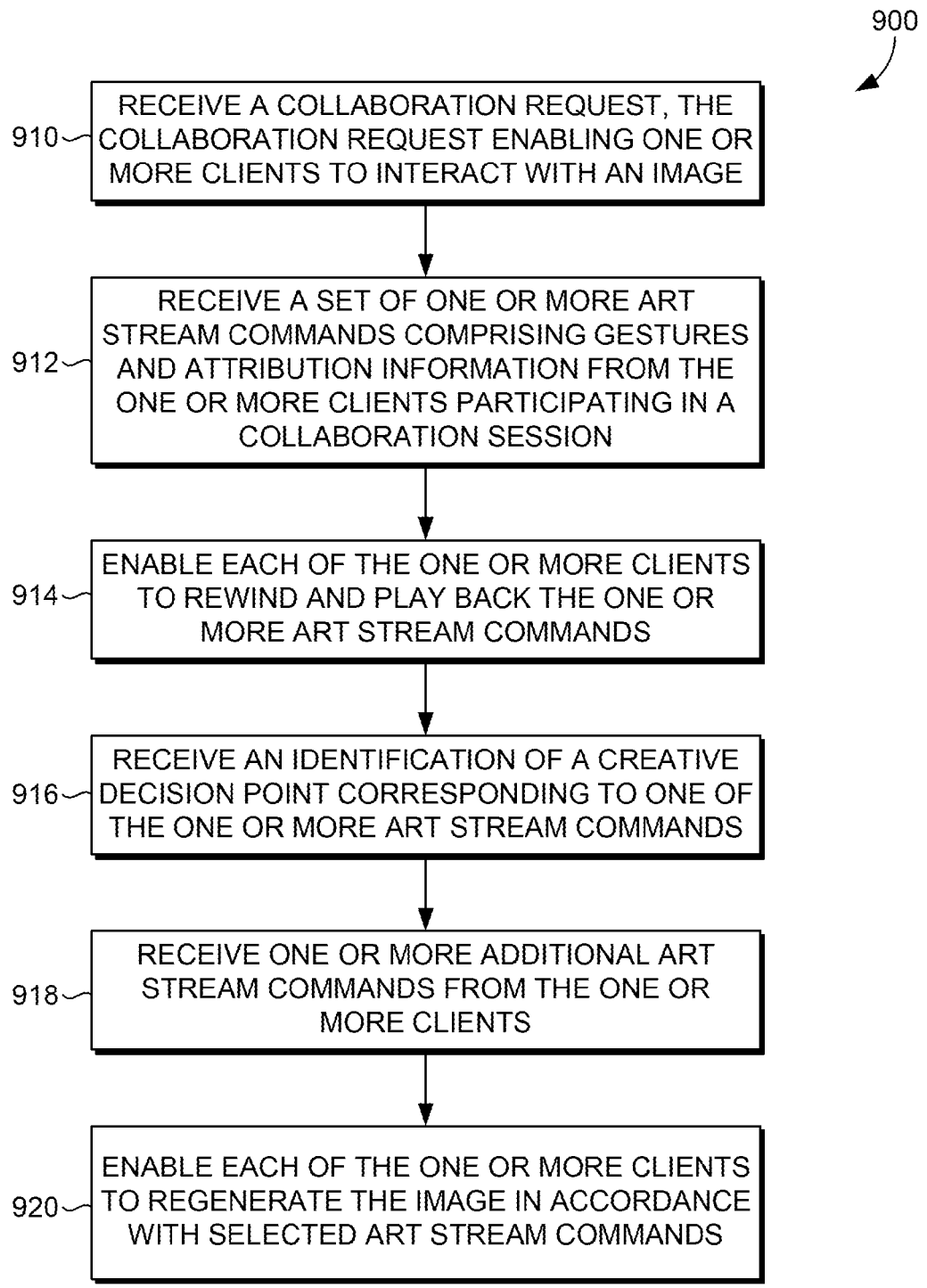
FIG. 9 is a flow diagram showing a method for generating image variations for a collaborative drawing in accordance with an embodiment of the present invention.

Turning to FIG. 9, a flow diagram is provided that illustrates a method 900 for generating image variations for a collaborative drawing in accordance with an embodiment of the present invention. The method 900 may be performed, for instance, by the visual differencing system 100 of FIG. 1. As shown at block 910, a collaboration request is received from one or more clients. The collaboration request may enable the one or more clients to interact with an image. The collaboration request may further include the selection of an existing image to incorporate into a collaboration session. A set of one or more art stream commands is received at block 912. The one or more art stream commands may comprise gestures, drawing state, and attribution information from the one or more clients participating in the collaboration session.

Each of the one or more clients is enabled, at block 914, to rewind and play back the one or more art stream commands. An identification of a creative decision point corresponding to one of the one or more art stream commands is received at block 916. One or more additional art stream commands is received, at block 918, from the one or more clients. Each of the art stream commands may be non-destructive. This may enable any of the clients to exclude any of the art stream commands from the image. Each of the one or more clients is enabled, at block 920, to regenerate the image in accordance with selected art stream commands. In one embodiment, the image is shared. The image includes attribution information for each of the one or more art stream commands and each of the one or more additional art stream commands. In one embodiment, the one or more additional art stream commands is merged into the set of one or more art stream commands to create a new image.

Figure 10:
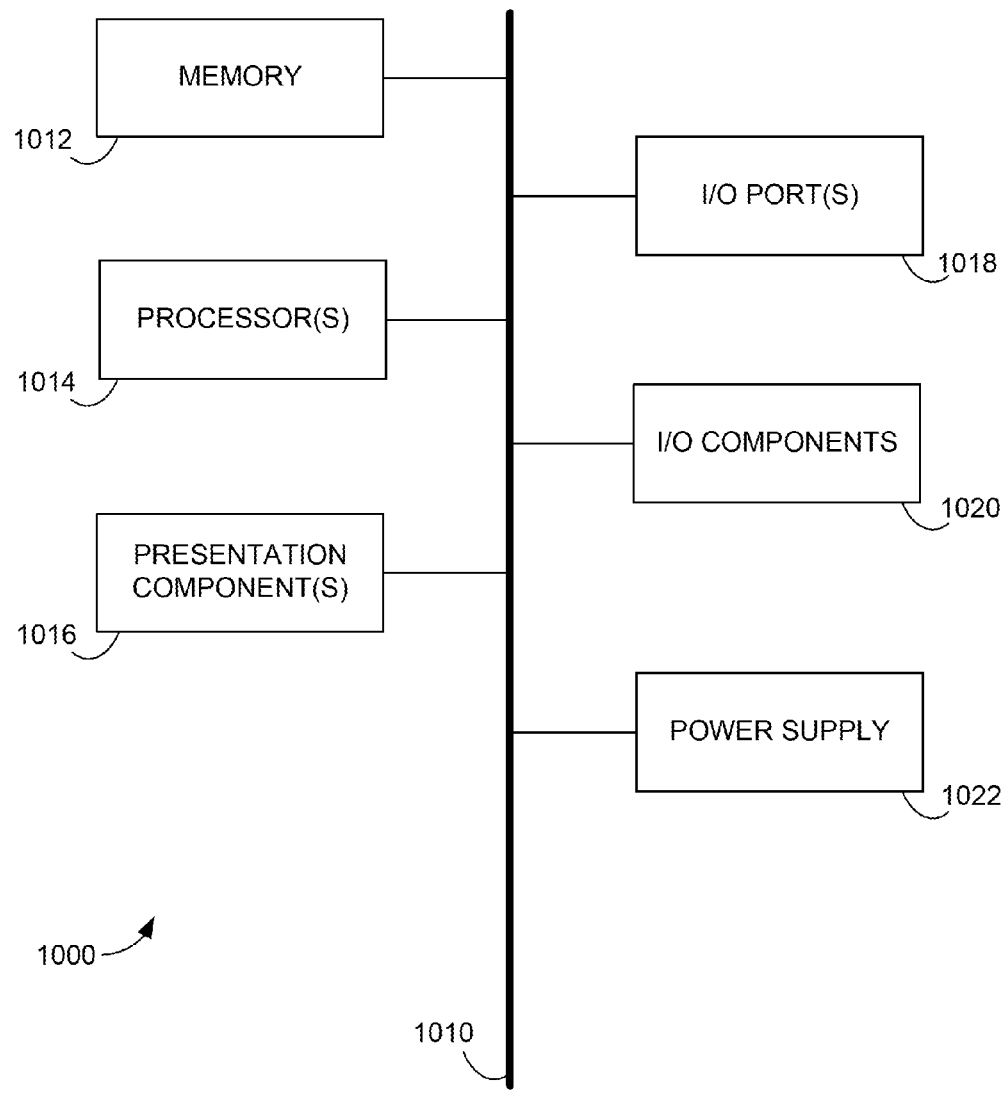
FIG. 10 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring to FIG. 10 in particular, an exemplary operating environment for implementing embodiments of the present invention is shown and designated generally as computing device 1000. Computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 10, computing device 1000 includes a bus 1010 that directly or indirectly couples the following devices: memory 1012, one or more processors 1014, one or more presentation components 1016, input/output (I/O) ports 1018, input/output components 1020, and an illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 10 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer-storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc. The I/O components 1020 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1000. The computing device 1000 may be equipped with depth cameras, such as, stereoscopic camera systems, infrared camera systems, RGB camera systems, and combinations of these for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

As can be understood, embodiments of the present invention provide for an objective approach for determining the visual differences between images. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A non-transitory computer storage medium comprising computer-useable instructions that, when used by one or more computing devices, cause the one or more computing devices to:
   receive one or more art stream commands from one or more clients, the one or more art stream commands comprising gestures, drawing state, and attribution information;
   merge the one or more art stream commands together into a merged set of art stream commands;
   communicate the merged set of art stream commands to the one or more clients; and
   separate the merged set of art stream commands in accordance with a selection of a layer from one of the one or more clients.

2. The non-transitory computer storage medium of claim 1, wherein the instructions further cause the one or more computing devices to: receive a selection of an existing image, the existing image comprising one or more art stream commands.

3. The non-transitory computer storage medium of claim 2, wherein the instructions further cause the one or more computing devices to: enable the existing image to be regenerated on a device associated with the one or more clients at a resolution optimized for the device without resizing the existing image.

4. The non-transitory computer storage medium of claim 1, wherein the instructions further cause the one or more computing devices to: enable the layer information to be included within the one or more art stream commands.

5. The non-transitory computer storage medium of claim 1, wherein the instructions further cause the one or more computing devices to: enable the layer to be selected based on the attribution information.

6. The non-transitory computer storage medium of claim 1, wherein the instructions further cause the one or more computing devices to:
   communicate a separated set of art stream commands in accordance with the selection.

7. The non-transitory computer storage medium of claim 1, wherein the instructions further cause the one or more computing devices to: enable the gestures to utilize normalized coordinates that can be mapped to pixels.

8. The non-transitory computer storage medium of claim 1, wherein the instructions further cause the one or more computing devices to: resolve conflicts between one or more art streams received at similar times.

9. The non-transitory computer storage medium of claim 1, wherein the instructions further cause the one or more computing devices to: communicate a visual difference set of art stream commands to one or more clients, the visual difference set of art stream commands comprising one or more art stream commands received between two points in time.

10. The non-transitory computer storage medium of claim 1, wherein the instructions further cause the one or more computing devices to: receive an identification of a creative decision point.

11. The non-transitory computer storage medium of claim 10, wherein the instructions further cause the one or more computing devices to: receive additional art stream command from one of the one or more clients.

12. The non-transitory computer storage medium of claim 11, wherein the instructions further cause the one or more computing devices to: replace an art stream command in the merged set with the additional art stream command.

13. The non-transitory computer storage medium of claim 11, wherein the instructions further cause the one or more computing devices to: merge the additional art stream command with the merged set of art stream commands.

14. A computer-implemented method comprising: receiving a collaboration request from one or more clients, the collaboration request enabling the one or more clients to interact with an image;
   receiving a set of one or more art stream commands comprising gestures, drawing state, and attribution information from the one or more clients participating in a collaboration session;
   enabling each of the one or more clients to rewind and play back the one or more art stream commands;
   receiving an identification of a creative decision point corresponding to one of the one or more art stream commands;
   receiving one or more additional art stream commands from the one or more clients, the one or more additional art stream commands being non-destructive; and
   enabling one of the one or more clients to regenerate the image in accordance with selected art stream commands by separating the set of one or more art stream commands in accordance with a selection of a layer from the one of the one or more clients.

15. The method of claim 14, further comprising merging the one or more additional art stream commands into the set of one or more art stream commands to create a new image.

16. The method of claim 14, further comprising receiving a selection of an existing image, the existing image comprising one or more art stream commands.

17. The method of claim 16, further comprising enabling the existing image to be regenerated on a device associated with the one or more clients at a resolution optimized for the device without resizing the existing image.

18. The method of claim 14, further comprising sharing the image, the image including attribution information for each of the one or more art stream commands and each of the one or more additional art stream commands.

19. A computerized system comprising:
   one or more processors; and
   one or more computer storage media storing computer-useable instructions that, when used by the one or more processors, cause the one or more processors to:
   receive a set of one or more art stream commands comprising gestures, drawing state, and attribution information from the one or more clients participating in a collaboration session, the set of one or more art stream commands corresponding to an image;
   separate the set of one or more art stream commands in accordance with a selection of a layer from one of the one or more clients; and
   enable the one of the one or more clients to rewind and play back the separated art stream commands.

* * * * *